United States Patent
Lin (10) Patent No.: US 9,967,466 B2
(45) Date of Patent: May 8, 2018

(54) ELECTRONIC DEVICE AND IMAGE PROCESSING METHOD THEREOF

(71) Applicant: HTC Corporation, Taoyuan, Taoyuan County (TW)

(72) Inventor: Sung-Hao Lin, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days. days.

(21) Appl. No.: 13/761,201

(22) Filed: Feb. 7, 2013

(65) Prior Publication Data
US 2013/0222670 A1    Aug. 29, 2013

Related U.S. Application Data

(60) Provisional application No. 61/602,676, filed on Feb. 24, 2012.

(51) Int. Cl.
*H04N 5/232* (2006.01)
(52) U.S. Cl.
CPC ......... *H04N 5/23293* (2013.01); *H04N 5/232* (2013.01)
(58) Field of Classification Search
CPC ........... H04N 5/23293; H04N 2101/00; H04N 1/2112; H04N 1/0044; H04N 5/772
USPC .................................................... 348/333.11
See application file for complete search history.

(56) References Cited

U.S. PATENT DOCUMENTS

| 8,681,236 | B2* | 3/2014 | Baek | 348/222.1 |
| 9,007,383 | B2* | 4/2015 | Martinik | G06F 9/455 |
| | | | | 345/520 |
| 2004/0070679 | A1* | 4/2004 | Pope | 348/231.99 |
| 2005/0185058 | A1 | 8/2005 | Sablak | |
| 2010/0321530 | A1 | 12/2010 | Baek | |
| 2011/0199470 | A1 | 8/2011 | Moller et al. | |
| 2012/0009896 | A1* | 1/2012 | Bandyopadhyay et al. | 455/411 |
| 2012/0081566 | A1* | 4/2012 | Cote | H04N 5/2256 |
| | | | | 348/222.1 |

FOREIGN PATENT DOCUMENTS

CN    1691777 A    11/2005

OTHER PUBLICATIONS

European Search Report dated Nov. 27, 2013.
Office Action issued in corresponding China application dated Aug. 27, 2015.
Examination Report issued in corresponding European application No. 13 000 908.7 dated Nov. 12, 2015.
European Examination Report dated Dec. 5, 2013.

* cited by examiner

*Primary Examiner* — Twyler Haskins
*Assistant Examiner* — Fayez Bhuiyan
(74) *Attorney, Agent, or Firm* — McClure, Qualey & Rodack, LLP (57) ABSTRACT

An electronic device and an image processing method are provided. The present invention can pre-capture images or pre-record video into a special buffer during the launching time of an image application upon the image application being launched. Accordingly, whether a user interface corresponding to the image application is ready or not, once a user triggers a camera event via a touch screen and/or other input modules for capturing images or recording video, the pre-captured image frames can be provided instantly to the user without long waiting.

12 Claims, 6 Drawing Sheets

ELECTRONIC DEVICE AND IMAGE PROCESSING METHOD THEREOF

This application claims priority to U.S. Provisional Patent Application No. 61/602,676 filed on Feb. 24, 2012, which is hereby incorporated by reference in its entirety.

CROSS-REFERENCES TO RELATED APPLICATIONS

Not applicable.

BACKGROUND OF THE INVENTION

Field of the Invention

The present invention relates to an electronic device and an image processing method. More particularly, the present invention relates to an electronic device with an image pre-capture function and an image processing method thereof.

Descriptions of the Related Art

Various electronic devices (e.g., conventional mobile phones, smart phones, notebook computers, tablet computers, etc.) have become indispensable to everyday lives of modern people. Almost all electronic device manufacturers have tried to design electronic devices to keep up with consumer needs. Among these designs, combining various image applications with electronic devices has been regarded as a requirement for people over recent years.

The user may capture pictures or record video by use of such electronic devices. Nevertheless, any image application always requires a significant launching time to be ready for subsequently capturing images or recoding video. Therefore, the electronic devices can not capture any image or record any video for users during the launching time of the image application upon the image application being launched.

In view of this, an urgent need exists in the art to provide a solution to the problem in which the conventional electronic devices can not capture any image or record any video for users during the launching time of an image application upon the image application being launched.

SUMMARY OF THE INVENTION

In normal launch process of an image application on the conventional electronic devices, an image sensor module is first initialized with default setting upon triggering of the image application by the user. During the initialization process of the image sensor module, image frames will not be provided for preview and subsequent image capture. Meanwhile, the image application would prepare a user interface to be displayed on a display unit such as a screen. Since the user can not trigger a camera input for capturing images before those are completed, the conventional electronic devices can not capture any image or record any video during the launching time of the image application upon the image application being launched.

The primary objective of the present invention is to solve such problem. The present invention can pre-capture images or pre-record video into a special buffer during the launching time of an image application upon the image application being launched. Accordingly, whether a user interface corresponding to the image application is ready or not, if only the user triggers a camera event via a touch screen and/or other input modules for capturing images or recording video, the pre-captured image frames will be provided instantly to the user without long waiting.

To achieve the aforesaid objective, the present invention provides an electronic device for executing an image application. The electronic device comprises an input module, an image sensor module, an image processor, a first buffer and an image coding module. The input module is configured to receive a user input for launching the image application. The image sensor module is configured to be initialized in response to the user input and capture at least one first image frame upon the image sensor module turning to a first state during the initialization before the image application is fully launched. The image processor is configured to receive and process the first image frame captured by the image sensor module. The first buffer is configured to store the first image frame processed by the image processor. The image coding module is configured to receive the first image frame from the first buffer and encode the first image frame in response to an image operation input received from the input module.

To achieve the aforesaid objective, the present invention further provides an image processing method applied in an electronic device comprising an input module, an image sensor module, an image processor and an image coding module. The image processing method comprises the following steps of:

receiving a user input from the input module for launching an image application;

initializing the image sensor module in response to the user input;

capturing at least one first image frame by the image sensor module upon the image sensor module turning to a first state during the initialization before the image application is fully launched;

processing the first image frame by the image processor;

storing the first image frame processed by the image processor in a first buffer;

receiving an image operation input from the input module; and encoding the first image frame stored in the first buffer by the image coding module in response to the image operation input.

To achieve the aforesaid objective, the present invention further provides another image processing method applied in an electronic device comprising an input module, an image sensor module, a display module and a first buffer. The image processing method comprises the following steps of:

launching an image application via the input module;

initializing the image sensor module in response to the launching of the image application;

capturing at least one first image frame by the image sensor module prior to a user interface corresponding to the image application being provided on the display module, before the image application is fully launched; and storing the first image frame in the first buffer.

The detailed technology and preferred embodiments implemented for the subject invention are described in the following paragraphs accompanying the appended drawings for persons skilled in this field to well appreciate the features of the claimed invention.

DESCRIPTION OF THE PREFERRED EMBODIMENT

The present invention can be explained with reference to the following embodiments. However, these embodiments are not intended to limit the present invention to any specific environments, applications or implementations described in these embodiments. Therefore, the description of these embodiments is only for the purpose of illustration rather than to limit the present invention. In the following embodiments and attached drawings, elements not directly related to the present invention are omitted from depiction; and dimensional relationships among individual elements in the attached drawings are illustrated only for ease of understanding but not to limit the actual scale.

Figure 1:
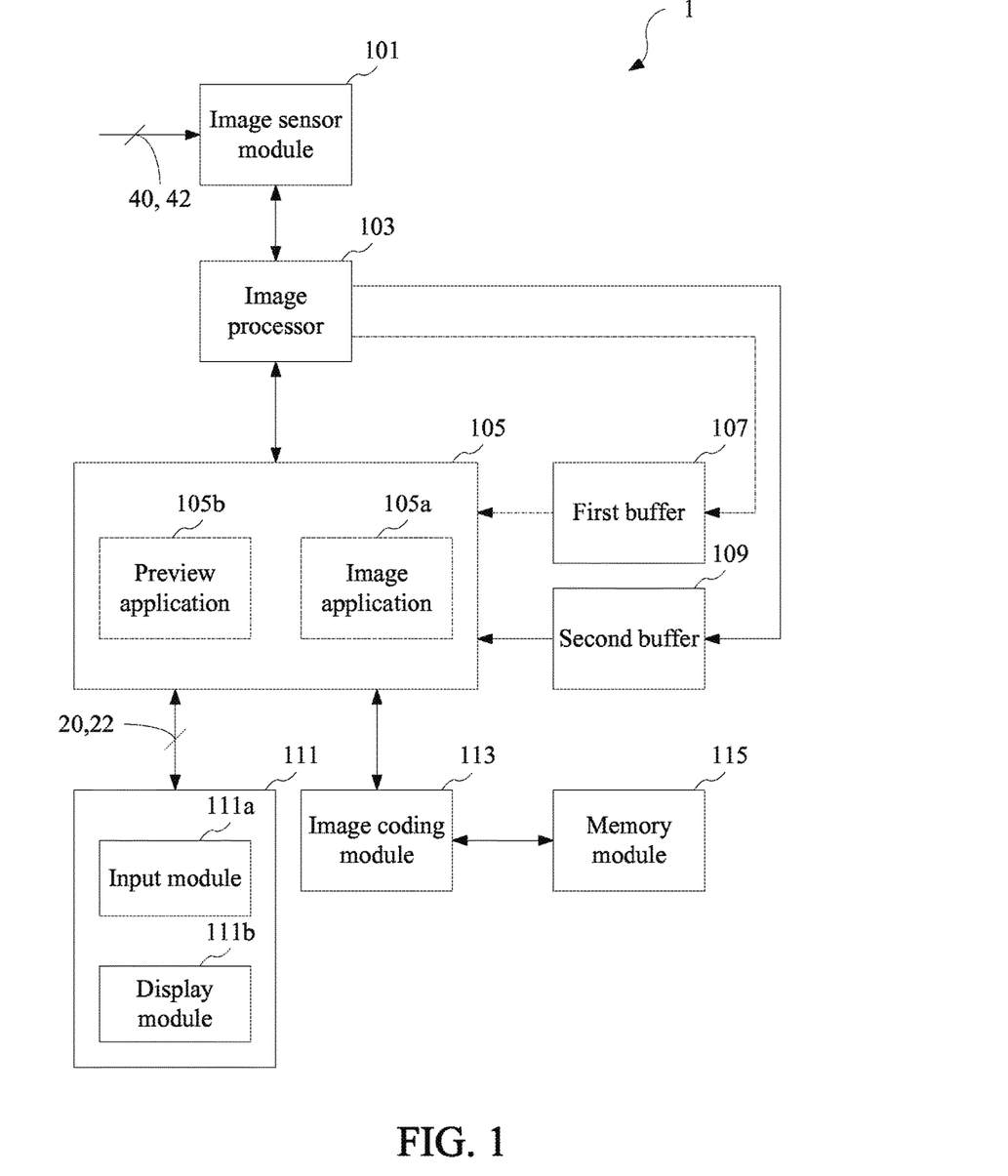
FIG. 1 is a schematic view illustrating an electronic device according to a first embodiment of the present invention.

A first embodiment of the present invention is as shown in FIG. 1, which depicts an electronic device 1 of the present invention. The electronic device 1 may be a smart phone or some other electronic devices with a camera function. For example, the electronic device 1 may also be a notebook computer, a tablet computer, a personal digital assistant (PDA), a digital camera etc.

As shown in FIG. 1, the electronic device 1 may comprise a central processing unit 105 (or an application processor 105) for executing various different applications such as an image application 105a and a preview application 105b. The image application 105a may be a camera application applied for capturing images or a video application applied for recording video. The method in which the central processing unit 105 executes the image application 105a and the preview application 105b can be appreciated readily to persons skilled in the art, and thus will not be further described herein.

The electronic device 1 may further comprises an image sensor module 101, an image processor 103, a first buffer 107, a second buffer 109, an input module 111a, a display module 111b, an image coding module 113 and a memory module 115. In this embodiment, the input module 111a and the display module 111b are integrated and implemented as a touch screen 111 of the electronic device 1. That is, the touch screen 111 can work simultaneously as the input module 111a for receiving various inputs and work as the display module 111b for displaying. Note that the input module 111a may depart from the disposed touch screen 111 as an individual with the same functions in other embodiments.

The input module 111a is configured to receive a user input 20 for launching the image application 105a. Since the input module 111a is a part of the touch screen 111, the user input 20 may be received as the user taps an image application icon displayed on the touch screen 111 which is opened or taps somewhere of the touch screen 111 which is locked. Otherwise, if the input module 111a is disposed as an individual such as a hardware shutter key departing from the touch screen 111, the user input 20 may be received as the user push the hardware shutter key. Note that the aforesaid operating aspects for the input module 111a are not attended to limit the implements of the present invention, but only for the ease of descriptions.

The input module 111a may be coupled directly with the image application 105a or coupled indirectly with the image application 105a via the touch screen 111. After the user input 20 is received by the input module 111a, the user input 20 is further converted into an event by a driver module (not shown) of the central processing unit 105 and sent to the image application 105a. In this way, the image application 105a will be launched in response to the user input 20.

Meanwhile, the image sensor module 101 is initialized in response to the user input 20. As the image sensor module 101 begins to be initialized, the image sensor module 101 may try to capture at least one first image frame 40 (i.e., one or more raw image frames) prior to the image application 105a being fully launched. Preferably, during the initialization of the image sensor module 101, the image sensor module 101 may capture the at least one first image frame 40 upon the image sensor module 101 turning to a first state.

The initialization of the image sensor module 101 may be completed with proper setting, for example, exposure, focus and/or others. However, the first state may be just an auto-exposure (AE) stable state, i.e., exposure setting is done on the image sensor module 101. The first state, however, may be an auto focus (AF) stable state or others in other embodiments. Note that the aforesaid types of the first state are not attended to limit the implements of the present invention, but only for the ease of descriptions; and types of the first state can be determined according to different circumstances.

The image sensor module 101 is coupled with the image processor 103, and provides the at least one first image frame 40 which is captured upon the image sensor module 101 turning to a first state to the image processor 103. Note that the image sensor module 101 may capture some image frames before the image sensor module 101 turns to the AE stable state and provides these image frames to the image processor 103; however, these image frames are in bad quality and thus should not be provided.

Upon receiving the at least one first image frames 40 from the image sensor module 101, the image processor 103 such as an image signal processor (ISP) may performs various processes on the at least one first image frames 40. For example, the image processor 103 may process the at least one first image frames 40 to generate input image frames (not shown) in RGB format. The image processor 103 is coupled with the first buffer 107, and the input image frames, i.e., the at least one first image frame 40 processed by the image processor 103, are temporarily stored in the first buffer 107.

The first buffer 107 may be configured as a ring buffer and constantly updated with new input image frames, and may be flushed and released upon the image application 105a being fully launched; however, this is not intended to limit the implements of the present invention. Furthermore, the type of first buffer may be determined according to the type of the image application 105a. For example, if the image application 105a is a camera application, the first buffer 107 is adapted to the camera application; and if the image application 105a is a video application, the first buffer 107 is adapted to the video application. Note that the first buffer 107 may comprise two independent buffers which correspond respectively to the camera application and the video application.

The image coding module 113 is coupled with central processing unit 105, and configured to receive the at least one first image frame 40 from the first buffer 107 and encode the at least one first image frame 40 stored in the first buffer 107 in response to an image operation input 22 received from the input module 111*a*. More specifically, when the user triggers an image event (not shown) via the input module 111*a* for capturing images or recording video, the image application 105*a* will detect a corresponding image operation input 22 so that the at least one first image frame 40 stored in the first buffer 107 may be sent to the image coding module 113 for coding into JPEG format in response to the image operation input 22. Subsequently, the at least one first image frame 40 encoded by the image coding module 113 may be stored in the memory unit which is coupled with the image coding module 113.

The display module 111*b* is configured to display a user interface (not shown) corresponding to the image application 105*a*. When the image sensor module 101 is initialized in response to the user input 20, the display module 111*b* may also begin displaying the user interface in response to the user input 20. In this way, the user may trigger the image event by operating the user interface displayed on the display module 111*b*. Once the user interface is displayed on the display module 111*b*, the image application 105*a* may be fully launched.

Based on the aforesaid operations, even the image application 105*a* is not fully launched, i.e., during the launching time of the image application 105*a*, the user may still be able to capture images or cording video without further delay. As a result, it is possible to capture instant images or record instant video with minimum latency upon the image application 105*a* being launched.

On the other hand, the image sensor module 101 may further capture at least one second image frame 42 in response to the image sensor module 101 fully initialized. Similar to the at least one first image frame 40, the image processor 103 may perform various processes on the at least one second image frame 42, and the at least one second image frame 42 processed by the image processor 103 are temporarily stored in the second buffer 109 which is coupled with the image processor 103. Note that the first buffer 107 and the second buffer 109 may be combined as a whole buffer in other embodiments.

Furthermore, the image coding module 113 may be configured to receive the at least one second image frame 42 from the second buffer 109 and encode the at least one second image frame 42 stored in the second buffer 109 in response to the image operation input 22 received from the input module 111*a*. More specifically, when the user triggers an image event (not shown) via the input module 111*a* for capturing images or recording video, the image application 105*a* will detect a corresponding image operation input 22 so that the at least one second image frame 42 stored in the second buffer 109 may be sent to the image coding module 113 for coding into JPEG format in response to the image operation input 22. Subsequently, the at least one second image frame 42 encoded by the image coding module 113 may be stored in the memory unit. Please note that the image coding module 113 may also be integrated or implemented in the central processing unit 105 or the image processor 103 as a hardware component or software program code.

Since the image sensor module 101 is fully initialized, the at least one second image frame 42 processed by the image processor 103 may also provide for the preview application 105*b* simultaneously. Through the preview application 105*b*, the at least one second image frame 42 processed by the image processor 103 may be converted into proper size and format and then sent to the display module 111*b* of the touch screen 111 for preview. The display module 111*b* may display the at least one second image frame 42 processed by the image processor 103 and the aforesaid user interface simultaneously or separately for different circumstances. Note that the preview application 105*b* may be regarded as a part of the image application 105*a* in other embodiments.

The image operation input 22 mentioned above may be received before a predetermined time upon the image application 105*a* being fully launched. That is, the user may trigger the image event via the input module 111*a* for capturing images or recording video before the predetermined time upon the image application 105*a* being fully launched. For example, the user may trigger the image event via a hardware shutter key before the image application 105*a* being not fully launched (i.e., the user interface being not displayed on the display module 111*b* yet), while the user may trigger the image event via the user interface between the image application 105*a* being fully launched and the predetermined time. Note that the predetermined time may be set according to different circumstances, for example, may be set as 0.5 sec. The image operation input 22 mentioned above may also be received within a predetermined time window around a time that the image application 105*a* is fully launched.

Figure 2:
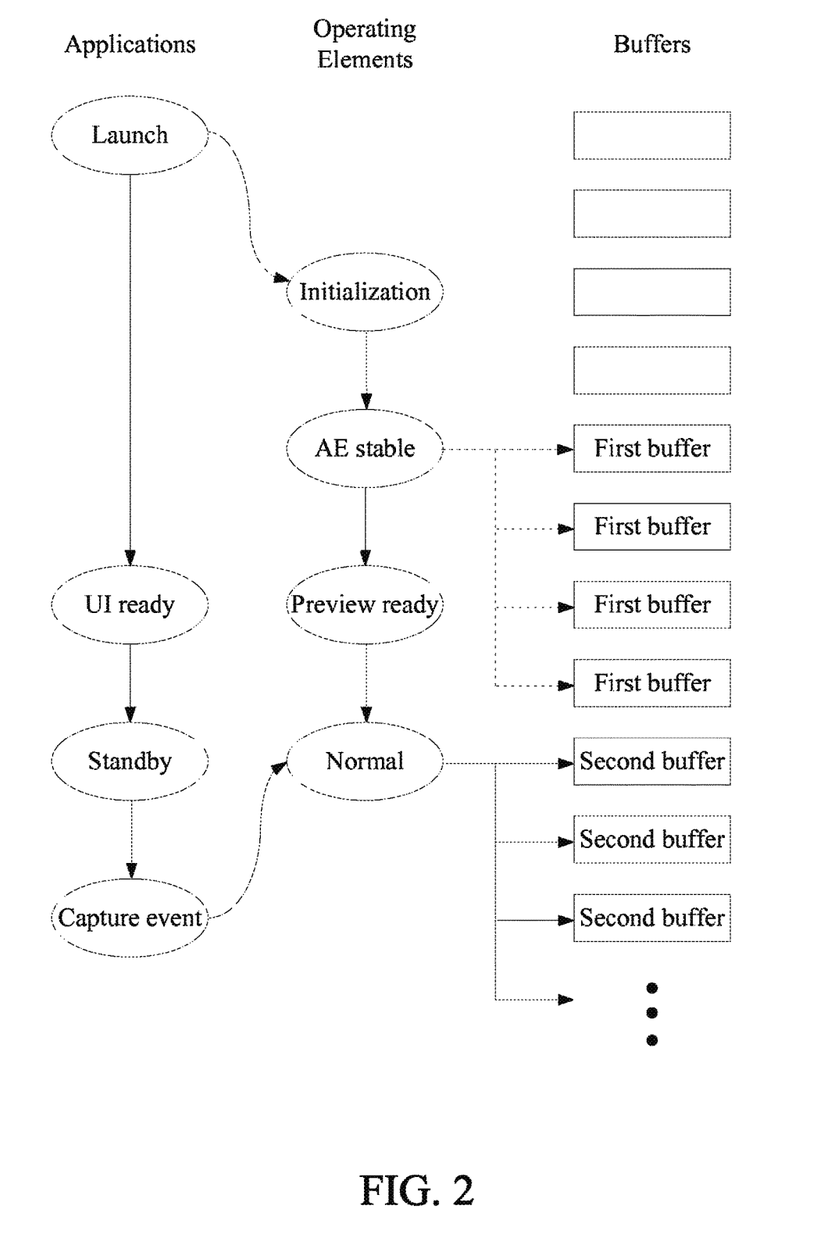
FIG. 2 is a schematic view illustrating an operating state translation of the electronic device according to the first embodiment of the present invention.

An example for the overall operation of the electronic device 1 is described in the following paragraphs accompanying FIG. 2, which depicts an operating state translation of the electronic device 1. As shown in FIG. 2, when the image application 105*a* is launched, the image sensor module 101 would begin to initialize. During the initialization, the image sensor module 101 turns to an AE stable state. Note that despite the state currently in, the image sensor module 101 is able to provide image frames to the image processor 103. However, before the image sensor module 101 enters the AE stable state, the image frames captured are in bad quality and cannot be used.

Once the image sensor module 101 enters the AE stable state, the image processor 103 would transmit one or more first image frames (i.e., the at least one first image frame 40) processed to the first buffer 107. The first buffer 107 may be flushed and released when the image application 105*a* enters the UI ready state. The first buffer 107 may be allocated to store one or more image frames transmitted by the image processor 103, depending on needs and requirements.

When the image sensor module 101 completes the initialization, the preview application 105*b* and the display module 111*b* may have been in a preview ready state for preview. Meanwhile, the image application 105*a* also prepares the user interface for display on the display module 111*b*.

Once the user interface is ready, the image application 105*a* enters a standby state to detect an image operation input 22 in response to an image event triggered by the user. Also, the electronic device 1 may enters a normal state for temporarily storing one or more second image frames (i.e., the at least one second image frame 42) in the second buffer 109.

If an image event triggered by the user is received from the user interface, the image frames stored in the second buffer 109 may be sent to the image coding module 113 for encoding as output. However, if the image event triggered by the user is received while the image application 105*a* does not enter the UI ready state yet, the image frames stored in the first buffer 107 may be sent to the image coding module 113 for encoding as output.

Figure 3A:
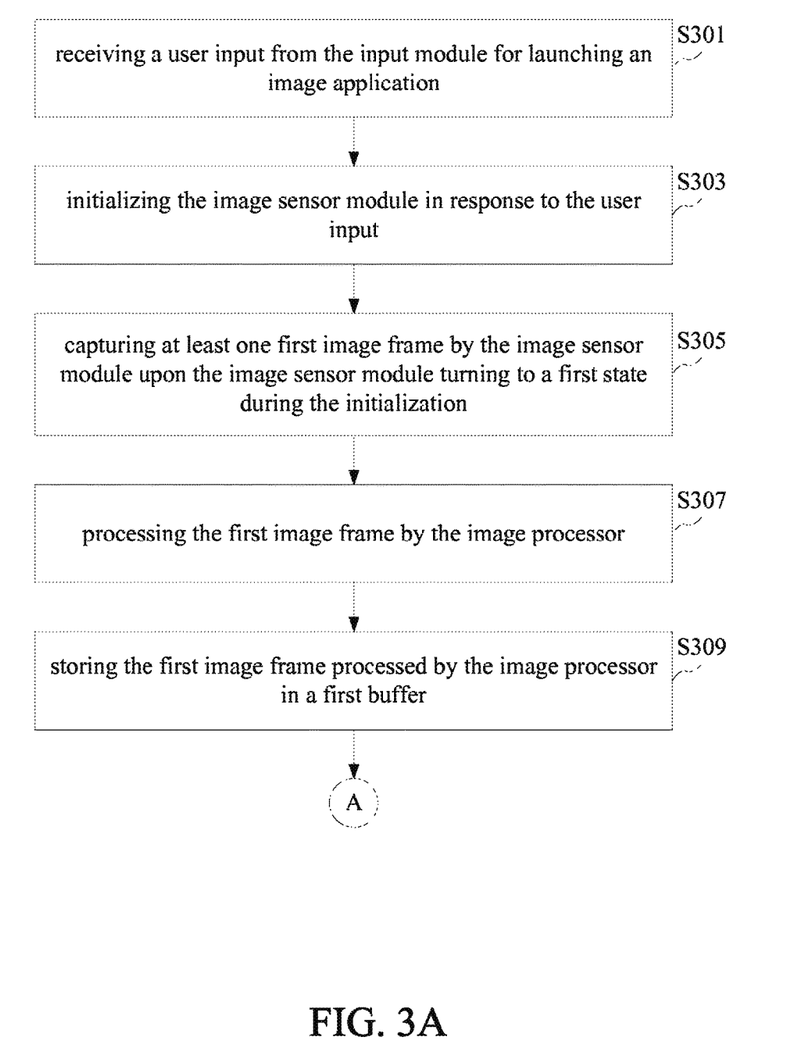
FIGS. 3A-3B is a flowchart diagram of an image processing method according to a second embodiment of the present invention.
Figure 3B:
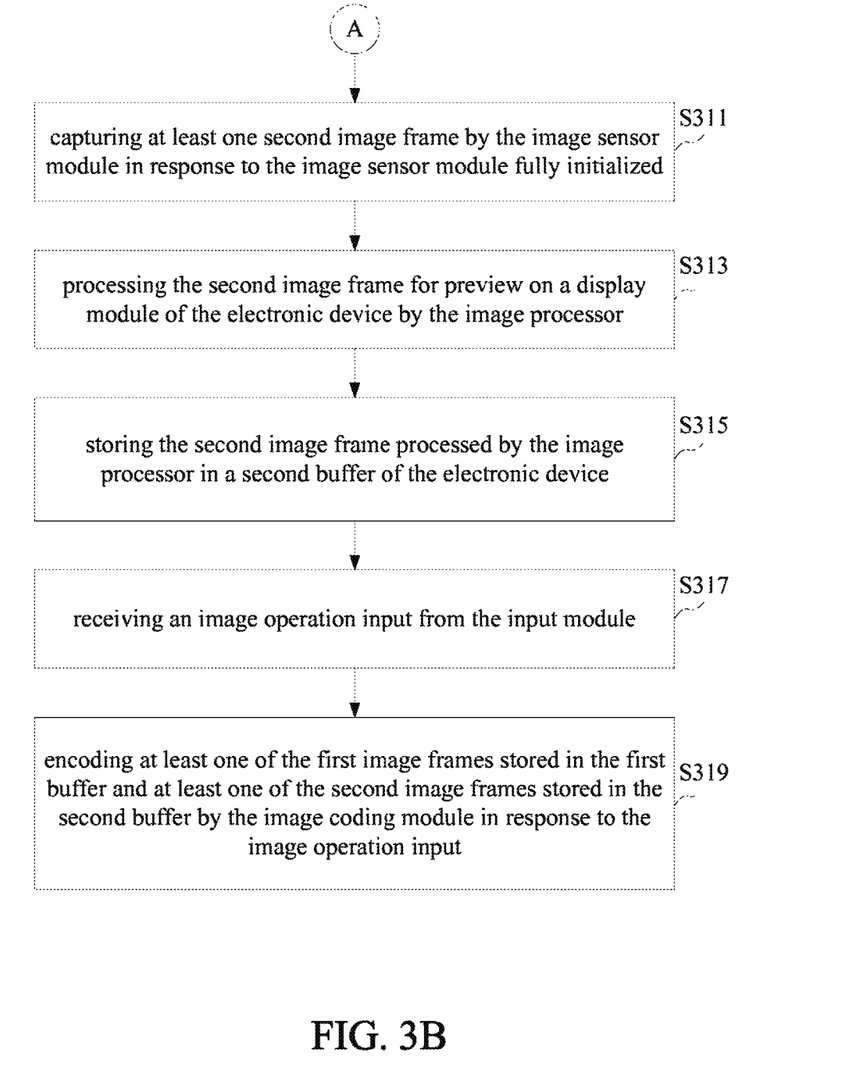

A second embodiment of the present invention is as shown in FIGS. 3A-3B, which depicts an image processing method. The image processing method of this embodiment can be applied in an electronic device comprising an input module, an image sensor module, an image processor and an image coding module, e.g., the electronic device 1 of the first embodiment.

As shown in FIG. 3A, step S301 is executed to receive a user input from the input module for launching an image application. Step S303 is executed to initialize the image sensor module in response to the user input. Step S305 is executed to capture at least one first image frame by the image sensor module upon the image sensor module turning to a first state during the initialization. The first state may be an auto-exposure stable state. Step S307 is executed to process the first image frame by the image processor. Step S309 is executed to store the first image frame processed by the image processor in a first buffer.

As shown in FIG. 3B, step S311 is executed to capture at least one second image frame by the image sensor module in response to the image sensor module fully initialized. Step S313 is executed to process the second image frame for preview on a display module of the electronic device by the image processor. The input module and the display module may be integrated and implemented as a touch screen of the electronic device. Step S315 is executed to store the second image frame processed by the image processor in a second buffer of the electronic device.

Step S317 is executed to receive an image operation input from the input module. The image operation input recited in the S317 may be received within a predetermined time window around a time that the image application is fully launched. Step S319 is executed to encode at least one of the first image frames stored in the first buffer and at least one of the second image frames stored in the second buffer by the image coding module in response to the image operation input.

If the image operation input is received after the image application is fully launched, the step S319 is executed to encode the second image frame stored in the second buffer by the image coding module in response to the image operation input. If the image operation input is received while the image application is not fully launched yet (prior to step S311), the step S319 is executed to encode the first image frame stored in the first buffer by the image coding module in response to the image operation input.

In other embodiments, the steps S311, S313 and S315 may be omitted. In this way, the step S319 is subsequent to the step S309 and executed to only encode the first image frame stored in the first buffer by the image coding module in response to the image operation input.

In other embodiments, the image processing method of this embodiment further comprises the step of: displaying a user interface corresponding to the image application on the display module in response to the user input; and wherein the image application is fully launched upon the user interface being displayed on the display module.

In other embodiments, the image processing method of this embodiment further comprises the step of: releasing the first buffer by flushing the first image frame upon the image application being fully launched.

In addition to the aforesaid steps, the image processing method of this embodiment can also execute all the operations of the electronic device 1 set forth in the aforesaid embodiments and accomplish all the corresponding functions. The method in which the image processing method of this embodiment executes these operations and accomplishes these functions can be readily appreciated by those of ordinary skill in the art based on the explanations of the aforesaid embodiments, and thus will not be further described herein.

Figure 4A:
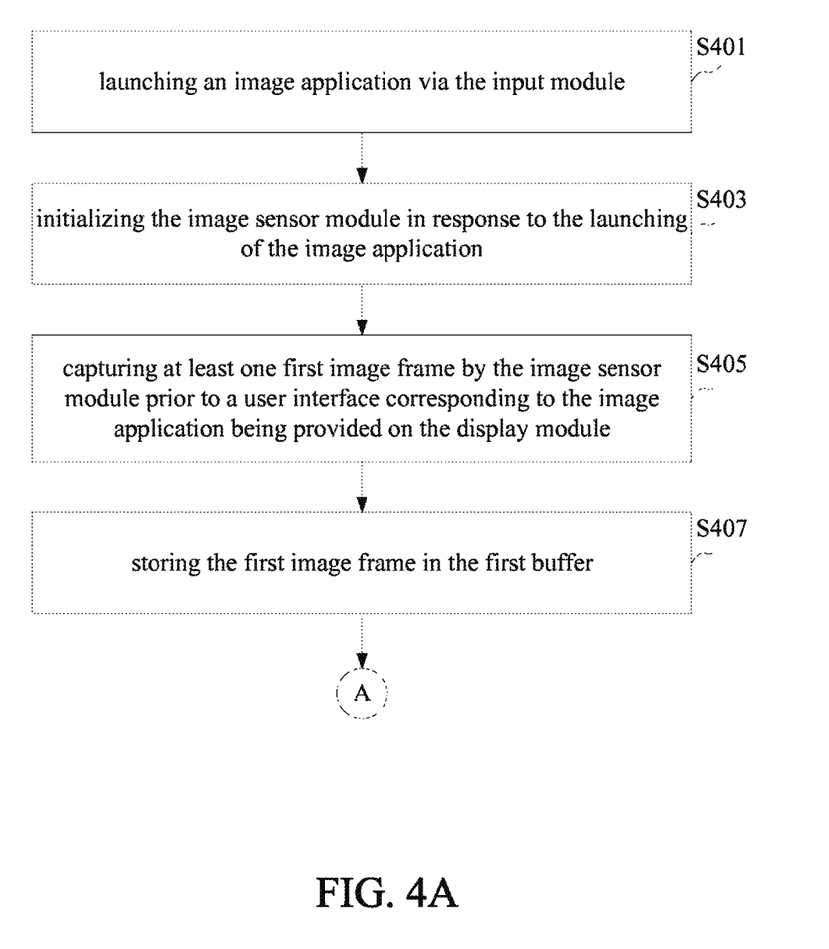
FIGS. 4A-4B is a flowchart diagram of an image processing method according to a third embodiment of the present invention.
Figure 4B:
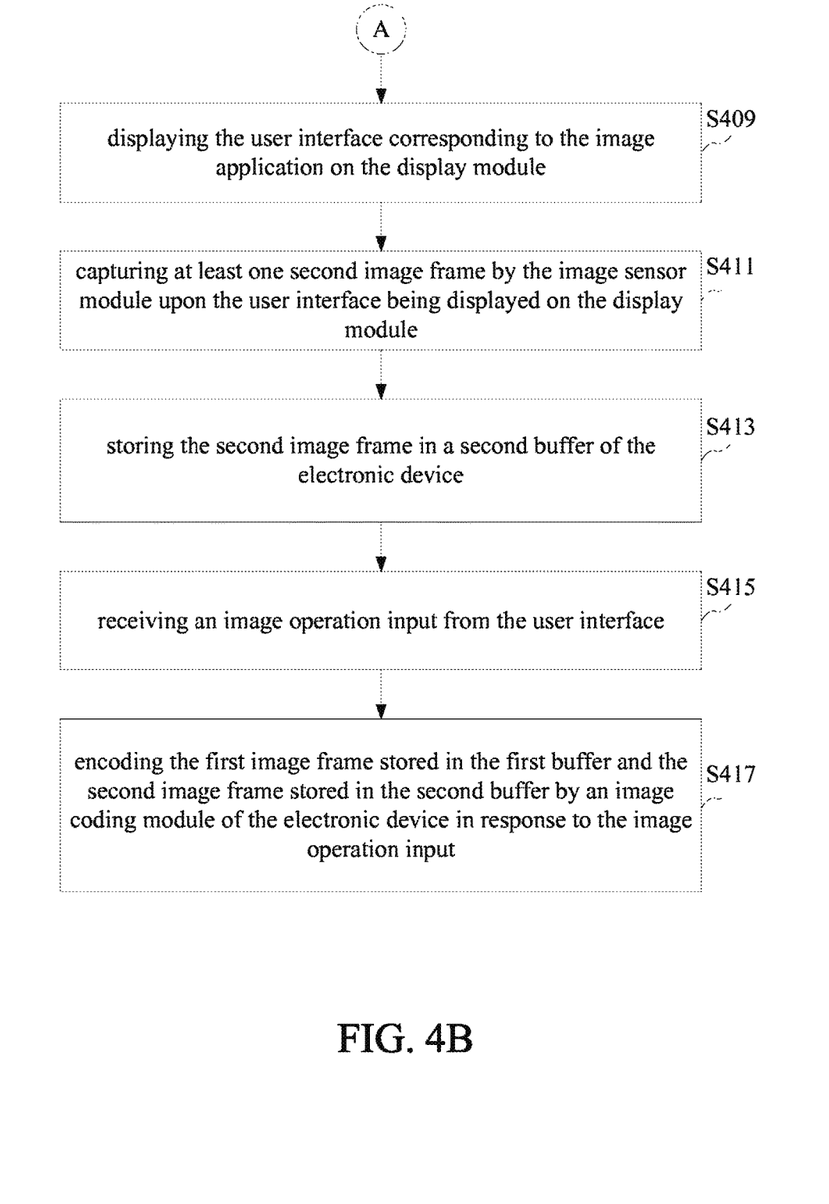

A third embodiment of the present invention is as shown in FIGS. 4A-4B, which depicts an image processing method. The image processing method of this embodiment can be applied in an electronic device comprising an input module, an image sensor module, a display module and a first buffer, e.g., the electronic device 1 of the first embodiment.

As shown in FIG. 4A, step S401 is executed to launch an image application via the input module. Step S403 is executed to initialize the image sensor module in response to the launching of the image application. Step S405 is executed to capture at least one first image frame by the image sensor module prior to a user interface corresponding to the image application being provided on the display module. The first image frame may be captured by the image sensor module upon the image sensor module turning to an auto-exposure stable state during the initialization. Step S407 is executed to storing the first image frame in the first buffer.

As shown in FIG. 4B, step S409 is executed to display the user interface corresponding to the image application on the display module. Step S411 is executed to capture at least one second image frame by the image sensor module upon the user interface being provided on the display module. Step S413 is executed to store the second image frame in a second buffer of the electronic device. Step S415 is executed to receive an image operation input from the user interface. Step S417 is executed to encode the first image frame stored in the first buffer and the second image frame stored in the second buffer by an image coding module of the electronic device in response to the image operation input.

If the image operation input is received after the user interface is displayed on the display unit, the step S417 is executed to encode the second image frame stored in the second buffer by an image coding module of the electronic device in response to the image operation input. If the image operation input is received while the user interface is not displayed on the display unit yet, the step S417 is executed to encode the first image frame stored in the first buffer by the image coding module in response to the image operation input.

In other embodiments, the steps S409, S411, S413 and S415 may be omitted. In this way, the step S417 is subsequent to the step S407 and executed to only encode the first image frame stored in the first buffer by the image coding module in response to the image operation input.

In other embodiments, the image processing method of this embodiment further comprises the step of: storing the encoded first image frame and/or the encoded second image frame in a memory module of the electronic device.

In addition to the aforesaid steps, the image processing method of this embodiment can also execute all the operations of the electronic device 1 set forth in the aforesaid embodiments and accomplish all the corresponding functions. The method in which the image processing method of this embodiment executes these operations and accomplishes these functions can be readily appreciated by those of ordinary skill in the art based on the explanation of the aforesaid embodiments, and thus will not be further described herein.

According to the above descriptions, the present invention provides an electronic device and an image processing method thereof. The electronic device and the image processing method thereof can pre-capture images or pre-record video into a special buffer during the launching time of an image application upon the image application being launched. Accordingly, whether a user interface corresponding to the image application is ready or not, if only the user triggers a camera event via a touch screen and/or other input modules for capturing images or recording video, the pre-captured image frames will be provided instantly to the user without long waiting. Consequently, the present invention provides a solution to the problem in which the conventional electronic devices can not capture any image or record any video for users during the launching time of an image application upon the image application being launched.

The above disclosure is related to the detailed technical contents and inventive features thereof. Persons skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image processing method applied in an electronic device comprising an input key, an image sensor module, and a display, the method comprising the following steps of:
   launching an image-capture application via the input key;
   capturing at least one first image frame by the image sensor module before the image-capture application is fully launched;
   storing the at least one first image frame in a first buffer;
   capturing at least one second image frame by the image sensor module responsive to the image-capture application being fully launched;
   storing the at least one second image frame in a second buffer;
   displaying a user interface corresponding to the image-capture application on the display responsive to the image-capture application being fully launched; and
   receiving an image operation input corresponding to a request for image capture;
   wherein if the image operation input is received before the image-capture application is fully launched, the at least one first image frame is encoded for output from the first buffer to a memory module, and if the image operation input is received after the image-capture application is fully launched, the at least one second image frame is encoded for output from the second buffer to the memory module and the at least one first image frame is not encoded for output.

2. The image processing method of claim 1, wherein the image operation input is received from the input key before the image-capture application is fully launched.

3. The image processing method of claim 1, wherein the user interface provides preview of the at least one second image frame.

4. The image processing method of claim 3, wherein the image operation input is received from the user interface after the image-capture application is fully launched.

5. An electronic device, comprising:
   an input key, configured to launch an image-capture application;
   a display, configured to display a user interface corresponding to the image-capture application responsive to the image-capture application being fully launched;
   an image sensor module, being configured to capture at least one first image frame before the image-capture application is fully launched and to capture at least one second image frame responsive to the image-capture application being fully launched;
   a first buffer, configured to store the at least one first image frame;
   a second buffer, configured to store the at least one second image frame;
   an image encoder; and
   a memory module;
   wherein if an image operation input corresponding to a request for image capture is received before the image-capture application is fully launched, the image encoder is configured to encode the at least one first image frame for output from the first buffer to the memory module, and if the image operation input is received after the image-capture application is fully launched, the image encoder is configured to encode the at least one second image frame for output from the second buffer to the memory module and not encode the at least one first image frame.

6. The electronic device of claim 5, wherein the input key is configured to receive the image operation input before the image-capture application is fully launched.

7. The electronic device of claim 5, wherein the user interface is configured to provide preview of the at least one second image frame.

8. The electronic device of claim 7, wherein the user interface is configured to receive the image operation input after the image-capture application is fully launched.

9. An electronic device, comprising:
   A touch screen, configured to launch an image-capture application and display a user interface corresponding to the image-capture application responsive to the image-capture application being fully launched;
   an image sensor module, being configured to capture at least one first image frame before the image-capture application is fully launched and to capture at least one second image frame responsive to the image-capture application being fully launched;
   a first buffer, configured to store the at least one first image frame;
   a second buffer, configured to store the at least one second image frame;
   an image encoder; and
   a memory module;
   wherein if an image operation input corresponding to a request for image capture is received before the image-capture application is fully launched, the image encoder is configured to encode the at least one first image frame for output from the first buffer to the memory module, and if the image operation input is received after the image-capture application is fully launched, the image encoder is configured to encode the at least one second image frame for output from the second buffer to the memory module and not encode the at least one first image frame.

10. The electronic device of claim 9, wherein the touch screen is further configured to receive the image operation input before the image-capture application is fully launched.

11. The electronic device of claim 9, wherein the user interface is configured to provide preview of the at least one second image frame.

12. The electronic device of claim 11, wherein the user interface is further configured to receive the image operation input after the image-capture application is fully launched.

* * * * *